United States Patent [19]
Iketani et al.

[11] Patent Number: 5,202,890
[45] Date of Patent: Apr. 13, 1993

[54] BLOCK ERROR DETECTOR

[75] Inventors: Akira Iketani, Higashiosaka; Hiromasa Mizuki, Tokushima, both of Japan

[73] Assignee: Matsushita Electric Industrial Co., Ltd., Osaka, Japan

[21] Appl. No.: 534,276

[22] Filed: Jun. 7, 1990

[30] Foreign Application Priority Data

Jun. 9, 1989 [JP] Japan .................................. 1-147890

[51] Int. Cl.$^5$ .......................................... G11B 20/18
[52] U.S. Cl. .................................. 371/40.3; 371/31
[58] Field of Search ................... 371/57.1, 37.4, 40.3, 371/31; 360/38.1, 49, 53

[56] References Cited

U.S. PATENT DOCUMENTS 4,329,708  5/1982  Yamamoto et al. ............. 371/31 X
4,742,519  5/1988  Abe et al. ...................... 360/38.1 X

FOREIGN PATENT DOCUMENTS 2084363A  4/1982  United Kingdom .
2194851A  3/1988  United Kingdom .

OTHER PUBLICATIONS

"Replay of Digital Video Recordings at Non-Standard Tape Speeds", Wilkinson et al., 13th Int. TV Symposium, May 28, 1983, pp. 409-422.

Primary Examiner—Stephen M. Baker
Attorney, Agent, or Firm—Wenderoth, Lind & Ponack

[57] ABSTRACT

A train of data blocks, each carrying digital data and ID data are produced from a reading head as a tape passes the cylinder. A memory having a plurality of sections is provided, and a plurality of counters are provided correspondingly to the sections. The digital data are stored in a memory section identified by the ID data. Each time the digital data for one block is stored in a section in the memory, a counter corresponding to that section is incremented, and each time the digital data for one block is read out from a section in the memory, a counter corresponding to that section is decremented. Thus, as long as counter repeats "0" and "1", the data block is properly stored and properly read. However, if any one of the counters shows a number other than "0" and "1", it is understood that the writing or reading has been carried out twice in a row for the same section in the memory. Thus, an error in the ID data can be detected.

7 Claims, 3 Drawing Sheets

DIGITAL VIDEO DATA

BLOCK ERROR DETECTOR

BACKGROUND OF THE INVENTION

1. Field of the Invention

The present invention relates to a block error detector, and more particularly, to a detector for detecting an error in a storing position of a block data used, for example, in digital video data.

2. Description of the Prior Art

Data blocks B0, B1, B3, . . . such as that shown in FIG. 1 represent a recording pattern for recording digital data, such as digital video data. Each block is composed of a number of sub-blocks, each sub-block carrying different information. The first sub-block, at the very beginning of the block carries a sync data of two words long (one word is eight bit long). The second sub-block carries ID data of four words. The third sub-block carries image data of 240 words, and the fourth sub-block carries parity check data of four words. The data lengths are given merely as an example.

In the case of digital video data, the ID data includes, for example, a specific horizontal scan line. Therefore, the image data following the ID data will be used for filling the horizontal line identified by the ID data. The parity check data includes the parity information required for error correction of the ID data and/or any other data in each block.

During the reproducing operation, the sync data is first detected, and then the ID data is read out all or partially. The read ID data is used to define an address in a memory for storing image data. Then, the image data is read out and stored in the memory at a particular area identified by the address formed by the detected ID data.

According to the prior art digital data processor as described above, when there is an error in the detected ID data, the ID data will designate wrong area in the memory. Thus, the image data following the ID data will be stored in the wrong area.

The digital VCRs available at present are mostly for business use or for professional use and, therefore, the digital VCR is equipped with a high grade arrangement which rarely produces error. Therefore, even if an error is produced in the ID data, such an error can be easily corrected by the known error correction system, one of which is the parity check system.

However, the digital VCR for the private, use or home use as will be released in the market in the near future requires a high density recording system so as to enable long VCR recording time. Therefore, the rate of generation of error becomes great, resulting in serious defects, particularly when the error occurs in the ID data, as explained below.

For example, when an error occurs in the ID data that can not be corrected by the correction system, the address defined by such ID data will provide a wrong address. Thus, the image data following the ID data will be stored in a wrong area in the memory. In other words, because the data is not written to the correct memory address, a data regenerator according to the prior art results in a block error. Moreover, this error cannot be corrected with the parity information. For example, when the ID data which should represent a location A but erroneously represents a location B, the image data will not be written to the memory area corresponding to location A, and the contents of that memory area will not be renewed properly.

When the image data is then read from memory, the non-renewed image data, i.e., the old image data which was stored in the previous loading cycle, is obtained as the data from location A, but this data differs from what the data at A should actually be. Moreover, because the data parity information also refers to this non-renewed data, it is not possible to determine whether or not the data read was the non-renewed data.

The prior art digital data processor is thus not able to detect errors resulting from various causes using the parity information in the data block itself.

SUMMARY OF THE INVENTION

The present invention has been developed with a view to substantially solving the above described disadvantages and has for its essential object to provide a block error detector which can detect an error occurring in the ID data.

According to the present invention, a train of data blocks each carrying digital data and ID data are produced from a reading head as a tape passes the cylinder. A memory having a plurality of sections is provided, and a plurality of counters are provided corresponding to the sections. The digital data are stored in a memory at a section identified by the ID data. Each time the digital data for one block is stored in a section in the memory, a counter corresponding to that section is incremented, and each time the digital data for one block is read out from a section in the memory, a counter corresponding to that section is decreased. Thus, as long as counter repeats "0" and "1", the data block is properly stored and properly read. However, if any one of the counters shows a number other than "0" and "1", it is understood that the writing or reading has been carried out twice in a row for the same section in the memory. Thus, an error in the ID data can be detected.

In order to achieve the aforementioned object, according to the present invention, a block error detector for detecting an error in data blocks comprises a memory having a plurality of sections, each section having a plurality of segments for storing information signals for a plurality of data blocks. A writing address generator means is provided for generating a section writing address based on the ID block for designating a section in the memory means, and for generating a segment writing address for designating a segment in the designated section. A plurality of counters are provided correspondingly to the plurality of sections, respectively, and operated in response to the section writing address. Also, a detector means is provided for receiving counted results of said counters.

Thus, the detector means detects an error in said ID block when all the counters, which are all supposed to be incremented by "1" when all the ID data are properly detected, are not incremented by "1".

BRIEF DESCRIPTION OF THE DRAWINGS

These and other objects and features of the present invention will become clear from the following description taken in conjunction with the preferred embodiment thereof with reference to the accompanying drawings throughout which like parts are designated by like reference numerals, and in which.

DETAILED DESCRIPTION OF THE PREFERRED EMBODIMENT

Figure 1:
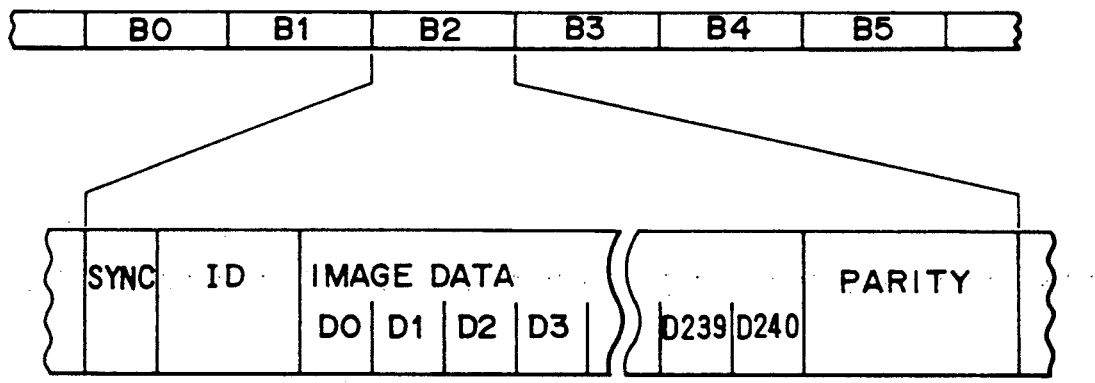
FIG. 1 is a diagrammatic view showing a structure of a data block.
Figure 2:
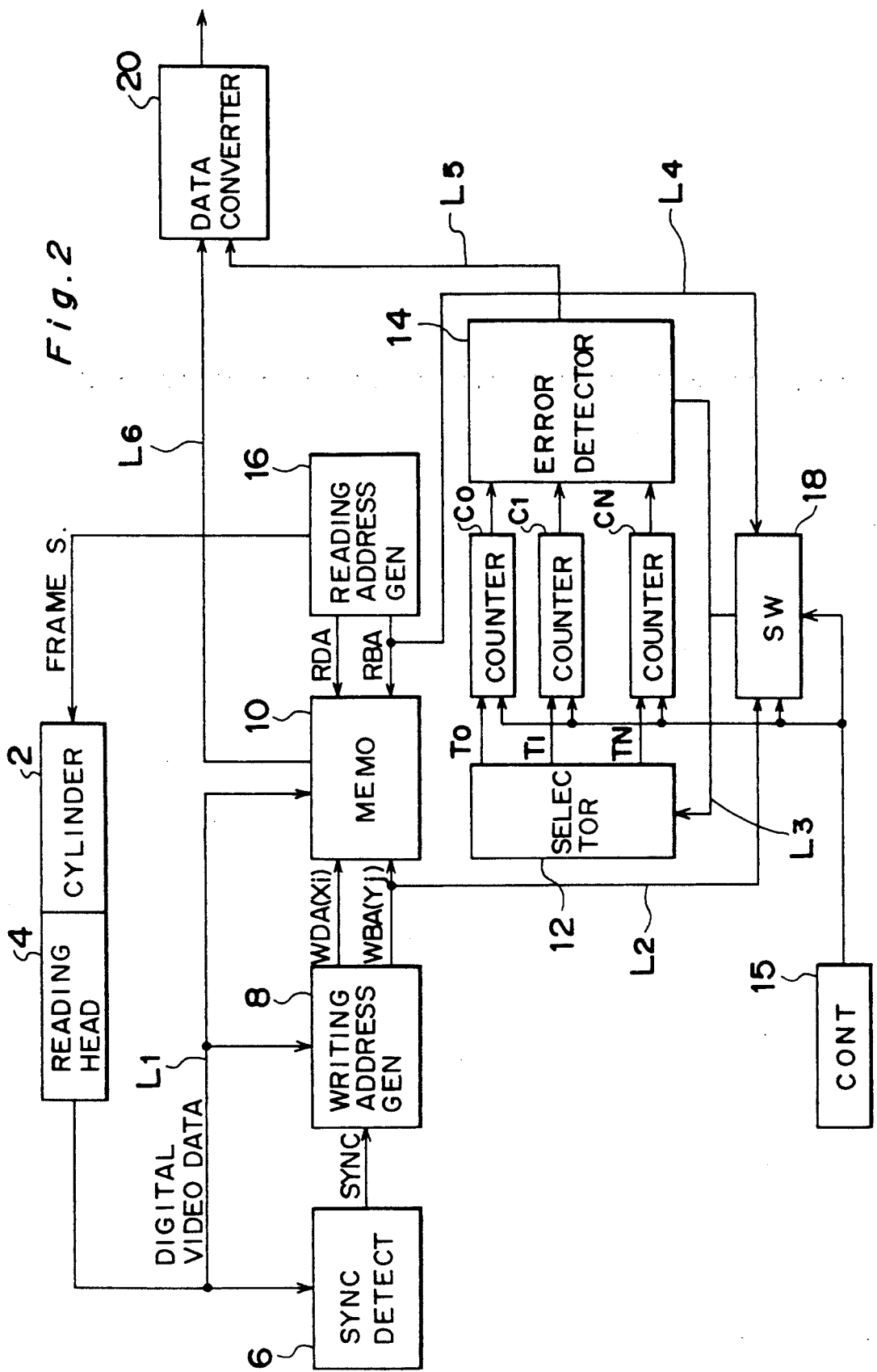
FIG. 2 is a block diagram of a block error detector according to a preferred embodiment of the present invention.

Referring to FIG. 2, a block error detector according to a preferred embodiment of the present invention is shown as employed in a digital video cassette recorder which has a cylinder 2 mounted with one or more recording heads 4. During the reproducing mode, the reading head 4 reads digital video data stored on a cassette tape as it passe along the rotating cylinder 2. The digital video data is shown in FIG. 1 and which includes data blocks B0, B1, B2, ... aligned serially. Each block is composed of a number of sub-blocks, each sub-block carrying different information. The first sub-block, at the very beginning of the block carries a sync data of two words long (one word is eight bit long). The second sub-block carries ID data of four words. The third sub-block carries image data of 241 words, and the fourth sub-block carries parity check data of four words. The data length are given merely as an example.

In the case of digital video data, the ID data includes, for example, a specific horizontal scan line. Therefore, the image data following the ID data will be used for filling the horizontal line identified by the ID data.

The block error detector includes a sync detector 6, a writing address generator 8 and a memory 10, which are connected in series and are also connected with a line L1 carrying the digital video data from reading head 4.

Sync detector 6 detects the sync data at the very beginning of each data block. When the sync data is detected, sync detector 6 activates write address generator 8 to receive the ID data following the sync data.

Upon receipt of the ID data, the writing address generator 8 forms and produces a write block address (WBA) and write data address (WDA) for specifying an area in the memory 10 in which the image data following the ID data is stored.

Figure 3:
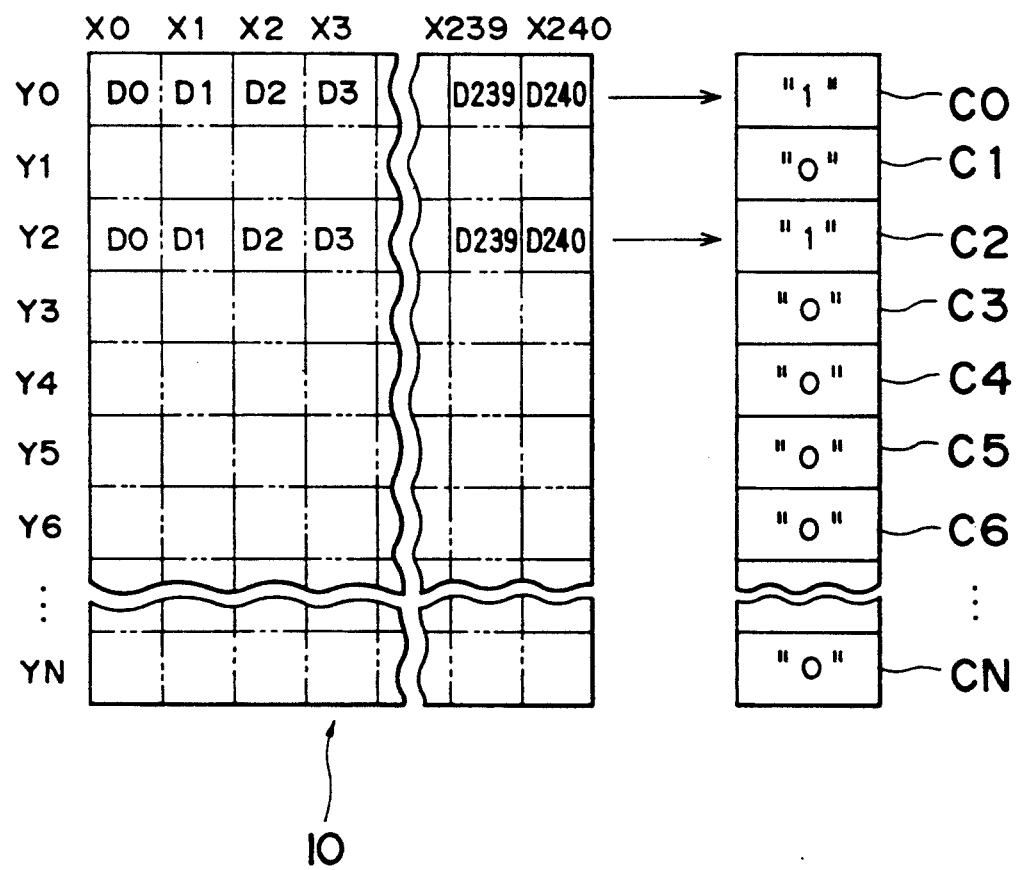
FIG. 3 is a schematic view of a memory and counters used in the block error detector of FIG. 2.

Referring to FIG. 3, a schematic view of memory 10 is shown in which each segment is identified by the vertical address Yi (i=0, 1, 2, ... N) and horizontal address Xj (j=0, 1, 2, ... , 240). According to this embodiment, the WBA represents vertical address Yi and WDA represents horizontal address Xi. The ID data is used for defining the address of a segment from which the storing starts. For example, when the data block B0 is produced from reading head 4, the address that will be formed by the writing address generator 8 with reference to ID data in data block B0 will be (Y0, X0). Thus, the first word D0 in the image data will be stored in segment (Y0, X0) in memory 10. Then, before the next word D1 comes, the writing address generator 8 produces next address (Y0, X1). Thus, the second word D1 in the image data will be stored in segment (Y0, X1). In this manner, in response to the ID data of data block B0, the writing address generator 8 sequentially produces addresses (Y0, X0), (Y0, X1), (Y0, X2), (Y0, X3), ... (Y0, X239) and (Y0, X240) so that image data D0, D1, D2, ... D239 and D240 are stored in the first row as shown in FIG. 3. In general terms, instead of saying that the WBA represents vertical address Yi and WDA represents horizontal address Xi, it can be said that the WBA represents block address Yi for specifying a block in which the whole data block is to be stored, and WDA represents data address Xi for specifying each segment in which the respective image data is to be stored.

According to the embodiment shown in FIGS. 2 and 3, memory 10 has a capacity for carrying N+1 data blocks. According to one example, N+1 is equal to 16.

The block address WBA, which is Yi in the above example, is also applied to a switching circuit 18 through line L2 and further to selector 12 through line L3. Switching circuit 18 is controlled by a control 15 such that line L2 is connected to L3 at the beginning of each data block, such as immediately after the generation of ID data.

Selector 12 has N outputs T0, T1, ... TN which are connected to counters C0, C1, ... CN, respectively. Counters C0, C1, ... CN have output terminals which are connected to an error detector 14, and control terminals which are connected to control 15, which also controls between writing mode operation and reading mode operation. During the writing mode operation, counters C0–CN are switched to count up state, and during the reading mode operation, counters C0–CN are switched to count down state. The output of error detector 14 is connected to a data converter 20 which is inserted in line L6 extending from an output of memory 10.

A reading address generator 16, which has a similar structure to that of writing address generator 8, produces a reading block address (RBA) and a reading data address (RDA) which are applied to memory 10. The RBA is also applied to switching circuit 18 through line L4. The RBA and RDA are produced relative to the frame signal which is also applied to the cylinder 2 for controlling the generation of the digital video data. Thus, the frame signal is in relation to the sync data.

In operation, memory 10 is originally stored with no data, and counters C1 to CN are reset to zero.

Writing Mode

First, control 15 is set to writing mode so that writing address generator 8 is activated and memory 10 is set to a condition for storing image data through line L1. When the first data block B0 is read out from reading head 4, writing address generator 8 sequentially generates addresses (Y0, X0), (Y0, X1), (Y0, X2), (Y0, X3), ... (Y0, X239) and (Y0, X240) so that image data D0, D1, D2, ... D239 and D240 are stored in the first row as shown in FIG. 3. In the mean time, as controlled by control 15, switching circuit 18 is operated to connected line L2 with line L3 at the beginning of the first data block B0, such as during when the writing address generator 8 is producing the first address (Y0, X0). Thus, at the beginning of the first data block B0, the writing block address, in this case Y0, is applied to selector 12. In response to WBA Y0, selector 12 produces a pulse from its first output terminal T0 so that counter C0 counts up to "1".

Then, when the second data block B1 is read out from reading head 4, writing address generator 8 sequentially generates addresses (Y1, X0), (Y1, X1), (Y1, X2), (Y1, X3), ... (Y1, X239) and (Y1, X240) so that image data D0, D1, D2, ... D239 and D240 are stored in the second row. In the mean time, as controlled by control 15, switching circuit 18 is operated to connected line L2 with line L3 at the beginning of the second data block B1, such as during when the writing address generator 8 is producing the first address (Y1, X0). Thus, at the beginning of the second data block B11, the writing block address, in this case Y1, is applied to selector 12. In response to WBA Y1, selector 12 produces a pulse from its second output terminal T1 so that counter C1 counts up to "1".

In this manner, when N+1 data blocks are produced from reading head 4 without any error in the ID data, memory 10 is filled with image data, and at the same time, counters C0–CN are all incremented to "1".

At this time, i.e., at the end of writing mode, error detector 14 detects the contents of counters C0–CN. In the above described case, since all the counters C0–CN are incremented to "1", the error detector detects that no error has occurred in any of the blocks during the writing of the data in memory 10.

Reading Mode

Then, control 15 is set to reading mode so that reading address generator 16 is activated and memory 10 is set to a condition for reading out stored image data through line L6. When the first data block B0 is to be read out, reading address generator 16 sequentially generates, in response to a field signal (this signal is in relation to sync signal and is also in relation to the frame signal), addresses (Y0, X0), (Y0, X1), (Y0, X2), (Y0, X3), ... (Y0, X239) and (Y0, X240) so that image data D0, D1, D2, ... D239 and D240 stored in the first row are sequentially transmitted through line L6 to data converter 20. In the mean time, as controlled by control 15, switching circuit 18 is operated to connected line L4 with line L3 at the beginning of the first data block B0, such as during when the reading address generator 16 is producing the first address (Y0, X0). Thus, at the beginning of the first data block B0, the reading block address, in this case Y0, is applied to selector 12. In response to WBA Y0, selector 12 produces a pulse from its first output terminal T0 so that counter C0 counts down to "0".

Then when the second data block B1 is to be read out from memory 10, reading address generator 16 sequentially generates addresses (Y1, X0), (Y1, X1), (Y1, X2), (Y1, X3), ... (Y1, X239) and (Y1, X240) so that image data D0, D1, D2, ... D239 and D240 stored in the second row are sequentially transmitted through line L6 to data converter 20. In the mean time, as controlled by control 15, switching circuit 18 is operated to connected line L4 with line L3 at the beginning of the second data block B1, such as during when the reading address generator 16 is producing the first address (Y1, X0). Thus, at the beginning of the second data block B1, the reading block address, in this case Y1, is applied to selector 12. In response to WBA Y1, selector 12 produces a pulse from its second output terminal T1 so that counter C1 counts down to "0".

In this manner, when N+1 data blocks are produced from reading address generator 16 without any error in the ID data, the data in memory 10 are all transferred to data converter 20, and at the same time, counters C0–CN are all to decremented to "0".

At this time, i.e., at the end of reading mode, the error detector 14 detects the contents of counters C0–CN. In the above described case, since all the counters C0–CN are decremented to "0", the error detector detects that no error has been occurred in any of the blocks during the reading of the data as stored in memory 10.

Next, when the ID data carries an error, such an error can be detected in the following manner.

First Type of Error

During the writing mode of the second data block B1, it is assumed that the ID data as produced from reading head 4 represents unidentified block data Y?. In this case, the writing address generator 8 sequentially generates addresses (Y?, X0), (Y?, X1), (Y?, X2), (Y?, X3), ... (Y?, X239) and (Y?, X240) so that image data D0, D1, D2, ... D239 and D240 for the second data block B1 will not be stored in any row in memory 10. Thus, the second row in memory 10 remains blank or remains with old data. Thus, when the writing mode ends, counters C0 and C2–CN are incremented to "1", but leaving counter C1 as "0".

Thus, at the end of writing mode, error detector 14 detects that the second row in the memory 10 is not renewed with the new image data.

Second Type of Error

During the writing mode of the second data block B1, it is assumed that the ID data as produced from reading head 4 represents not the second block Y1, but the third block Y2. In this case, the writing address generator 8 sequentially generates addresses (Y2, X0), (Y2, X1), (Y2, X2), (Y2, X3), ... (Y2, X239) and (Y2, X240) so that image data D0, D1, D2, ... D239 and D240 are stored in the third row, resulting in the skip of the second row, as shown in FIG. 3. Thus, counter C2 is incremented to "1", but leaving counter C1 as "0".

Then, when the third data block B2 comes with correct ID data, the writing address generator 8 sequentially generates addresses (Y2, X0), (Y2, X1), (Y2, X2), (Y2, X3), ... (Y2, X239) and (Y2, X240) so that image data D0, D1, D2, ... D239 and D240 are stored in the third row, resulting in correct data insertion in the third row over the data just entered by the previous data block. In this case, counter C2 is further incremented to "2", and yet leaving counter C1 as "0".

Thus, at the end of writing mode, error detector 14 detects that the second row in the memory 10 is not renewed with the new image data, and the third row is renewed twice.

In this manner, not only the data skip, but also the number of renewed data added to each row can be detected.

In a similar manner, when the ID data carries an error during the reading mode, such an error can be detected by the contents of the counters C0–CN. For example, if the second row is skipped during the reading mode, no count down is effected in counter C1. Thus, counters C0–CN at the end of the reading, mode would be such that counters C0 and C2–CN will be decremented to "0", but counter C1 remains unchanged to hold "1". Alternatively, if the second row is read twice during the reading mode, counter C1 will be counted down twice. In this case, the contents of counter C1 will change "1"→"0"→"−1".

The detected error signal is transmitted from error detector 14 through line L5 to data converter 20 which carries out a data compensation process to correct the image data in the error block in a known manner. For example, the horizontal line with error image data caused by the incorrect ID data may be replaced with a neighboring horizontal line, or with the same horizontal line obtained in a previous cycle.

Modifications

According to a first modification, control 15 may be so arranged to provide writing mode and reading mode signals in an interlaced manner so that the writing mode and reading mode operations are carried out in an interlaced manner.

According a second modification, error detector 14 is so arranged as to incorporate N+1 registers to receive the contents of counters C0-CN. Also, switching circuit 18 operates such that after the writing mode for writing N data blocks, the contents of each counter is sequentially shifted from the counter to corresponding register in response to each reading block address. For example, when a first reading block address Y0 is produced from reading address generator 16, Y0 is transmitted through lines L4 and L3 to error detector 14 so that the first register in error detector 14 is activated to receive the contents of counter C0. After the contents of the counter C0 is shifted to the corresponding register, the counter C0 is reset to zero. In this manner, the contents of the counters are shifted sequentially to the registers. At the end of the reading mode, if all the image data in blocks B0-BN have been properly stored in memory 10, and if all the stored image data have been read out from memory 10, all the registers in error detector will be carrying "1". However, if for example a block B1 carried incorrect ID data, counter C1 is maintained at "0" and thus, the second register will carry "0" at the end of the reading mode.

Figure 4:
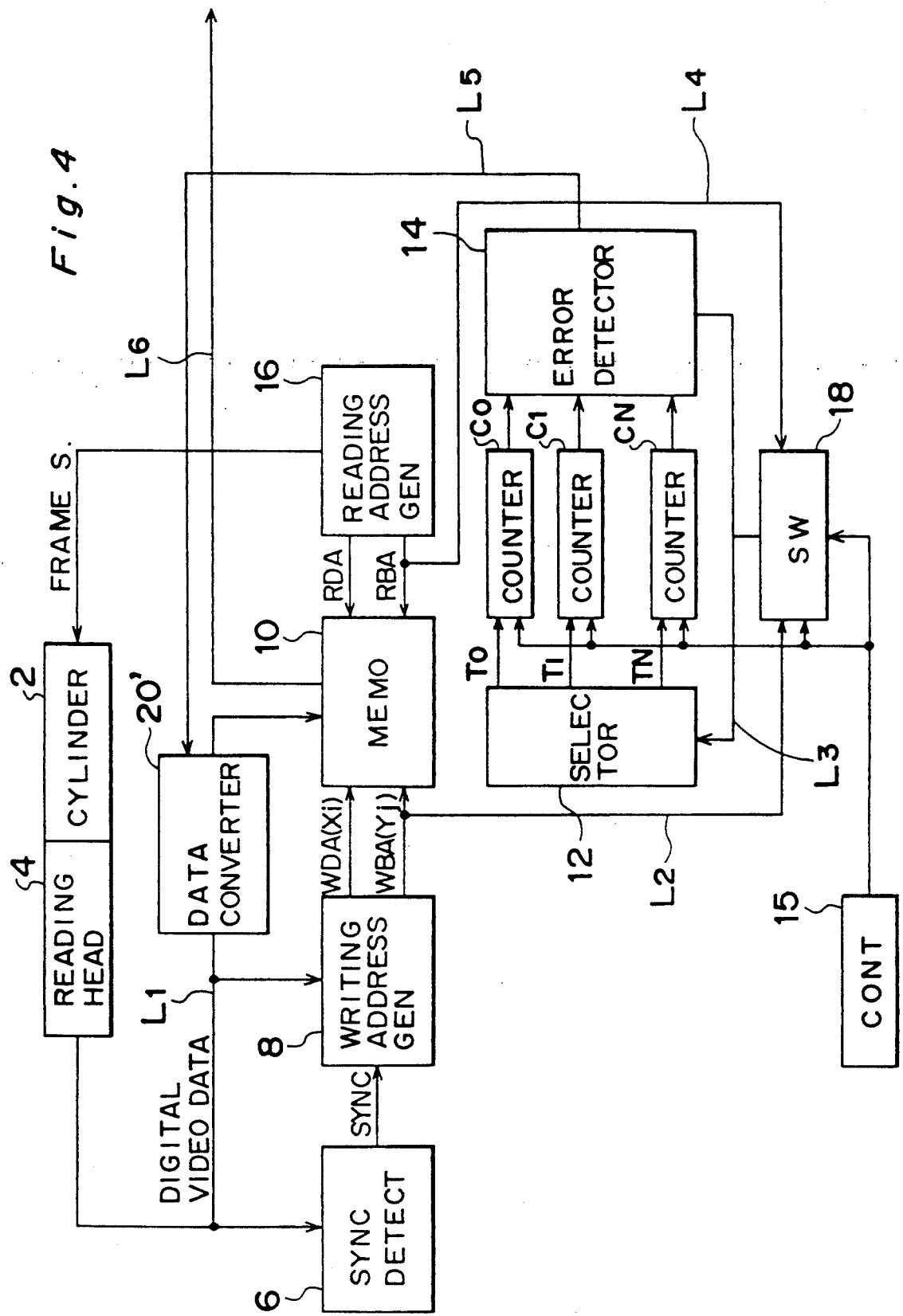
FIG. 4 is a view similar to FIG. 3, but showing a modification thereof.

According to a third modification, the data converter 20' is located in line L1, as shown in FIG. 4. In this modification, the data error correction can be carried out before the image data is stored in memory 10.

According to a fourth modification, the counters C0-CN can be so arranged as to provide only one counter and n+1 registers coupled to the counter.

The present invention is able to detect errors in ID data by the use of the counters and error detector 14. Thus, the block parity can be mainly used for correcting data other than the ID data.

The invention is not only limited for use in digital VCR, but can be used in other digital data transfer systems in which the data are arranged in blocks.

Although the present invention has been fully described in connection with the preferred embodiment thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A block error detector for detecting an error in data blocks, each block including sub-blocks consisting of an ID block and an information block carrying a plurality of information signals, said block error detector comprising:
   a memory means having a plurality of sections, each section having a plurality of segments for storing information signals for a plurality of data blocks;
   a writing address generator means for generating a section writing address based on said ID block for designating a section in said memory means, and for generating a segment writing address for designating a segment in the designated section;
   a plurality of counters provided correspondingly to said plurality of sections, respectively, and operated in response to said section writing address; and
   a detector means for receiving counted results of said counters;
   wherein said detector means includes a means for detecting an error in said ID block when all of said plurality of counters, which are incremented by "1" when all the ID data has been properly detected, have not been incremented by "1".

2. A block error detector as claimed in claim 1, further comprising:
   a reading address generator means for generating a section reading address at a predetermined frequency for designating a section in said memory means, and for generating a segment reading address for designating a segment in the designated section; and
   a switching means for switching between a writing mode in which the block data is written into said memory means by the control of said writing address generator means, and a reading mode in which the block data is read out from said memory means by the control of said reading address generator means, said switching means further switching said counters into a first mode of operation during said writing mode and a second mode of operation during said reading mode operation.

3. A block error detector as claimed in claim 2, wherein said counters are in a count up mode during said first mode operation, and are in a count down mode during said second mode operation.

4. A block error detector as claimed in claim 2, wherein said counters are in count up mode during said first mode of operation, and are in a shift mode for shifting the contents of a counter to said detector means during said second mode of operation.

5. A block error detector as claimed in claim 1, further comprising a data converter which receives a signal indicating an error from said detector means for correcting data error in data blocks.

6. A block error detector as claimed in claim 5, wherein said data converter is disposed in a line for sending information data read out from said memory means.

7. A block error detector as claimed in claim 5, wherein said data converter is disposed in a line for sending information data into said memory means.

* * * * *